（12） United States Patent
Vera

(10) Patent No.: US 10,665,978 B1
(45) Date of Patent: May 26, 2020

(54) ELECTRICAL RECEPTACLE PROTECTIVE ENCLOSURES

(71) Applicant: Yader Vera, Gaithersburg, MD (US)

(72) Inventor: Yader Vera, Gaithersburg, MD (US)

(*) Notice: Subject to any disclaimer, the term of this patent is extended or adjusted under 35 U.S.C. 154(b) by 0 days.

(21) Appl. No.: 16/694,682

(22) Filed: Nov. 25, 2019

Related U.S. Application Data

(60) Provisional application No. 62/880,323, filed on Jul. 30, 2019.

(51) Int. Cl.
H01R 13/639 (2006.01)
H01R 13/447 (2006.01)
H02G 3/14 (2006.01)

(52) U.S. Cl.
CPC ....... H01R 13/447 (2013.01); H01R 13/6395 (2013.01); H01R 13/6397 (2013.01); H02G 3/14 (2013.01)

(58) Field of Classification Search
CPC .............. H01R 13/447; H01R 13/453; H01R 13/6397; H01R 13/6395; H02G 3/14; H02B 1/066
USPC .................................... 174/67, 66; 439/138
See application file for complete search history.

(56) References Cited

U.S. PATENT DOCUMENTS

| 3,096,409 | A | * | 7/1963 | Hubbell | H01H 3/20 200/43.22 |
| 3,129,992 | A | * | 4/1964 | Blonder | H01R 13/447 439/133 |
| 3,363,216 | A |   | 1/1968 | Benedetto | |
| 4,063,110 | A | * | 12/1977 | Glick | H01R 13/6397 307/112 |
| 4,479,688 | A |   | 10/1984 | Jennings | |
| 4,531,800 | A |   | 7/1985 | Avener | |
| 4,593,541 | A | * | 6/1986 | Hollis | E05B 73/00 174/67 |
| 4,674,303 | A | * | 6/1987 | Salcone, II | A44B 11/2576 206/807 |
| 4,950,842 | A |   | 8/1990 | Menninga | |
| 5,243,135 | A |   | 9/1993 | Shotey | |

(Continued)

OTHER PUBLICATIONS

STIC search results (Year: 2020).*
"Dreambaby Dual Fit Plug and Electrical 2-Piece Outlet Cover", https://www.amazon.com/Dreambaby-Electrical-2-Piece-Outlet-Cover/dp/B07CL2Z1XM/.

Primary Examiner — Steven T Sawyer

(57) ABSTRACT

Various embodiments for electrical receptacle protective enclosures ("ERPE") are disclosed. The ERPE includes an enclosure configured to be demountably affixed to an electrical receptacle. The enclosure includes a main body and covering rotatably coupled to the main body and having locking arms extending therefrom. The enclosure includes "closed," "open," "locked," and "unlocked" states. The main body includes a mechanical fastening assembly positioned near apertures and configured to rotate in a common plane with a wall of the main body. The locking element comprises an indentation and a plate region positioned opposite the indentation. In the unlocked state, the indentation is aligned with the aperture and allows the locking arm to traverse the indentation and the protrusion to engage the aperture. In the locked state, the plate region is aligned with the aperture and restricts the locking arm from traversing the indentation and the protrusion from disengaging the aperture.

15 Claims, 15 Drawing Sheets

(56) References Cited

U.S. PATENT DOCUMENTS

| | | | |
|---|---|---|---|
| 5,731,544 A | 3/1998 | Burck et al. | |
| 6,198,046 B1 * | 3/2001 | Moodie | H01R 13/6395 |
| | | | 174/67 |
| 6,309,239 B1 * | 10/2001 | Johnston | H01R 13/447 |
| | | | 174/67 |
| 8,739,997 B1 * | 6/2014 | Ploof | H02G 3/14 |
| | | | 16/282 |
| 9,577,415 B1 * | 2/2017 | Veloskey | H05K 5/0026 |

* cited by examiner

ELECTRICAL RECEPTACLE PROTECTIVE ENCLOSURES

CROSS-REFERENCE TO RELATED APPLICATIONS

This application claims priority to U.S. Provisional Application No. 62/880,323 filed Jul. 30, 2019, which is hereby incorporated herein by reference.

FIELD OF THE INVENTION

The present invention relates generally to protective enclosures and specifically to electrical receptacles protective enclosures.

BACKGROUND OF THE INVENTION

Electrical receptacles (also known as electrical outlets) are sockets that connect electrical devices to electricity supplies. For example, in buildings, electrical outlets may be installed in walls, although they can also be installed in floors. The human body conducts electricity very well, which means that electricity passes very easily throughout the body. Direct contact with electrical current can result in electrical injury and occasionally death. While some electrical injuries look minor, there still may be serious internal damage, especially to the heart, muscles, or brain.

Electrical outlet covers can be utilized to prevent children from accessing electrical outlets or removing electrical plugs, which thereby reduces the probability of injury due to electrical shock.

BRIEF DESCRIPTION OF THE DRAWINGS

Some of the embodiments will be described in detail with reference to the following figures, wherein the designations denote like members, wherein.

Figure 1:
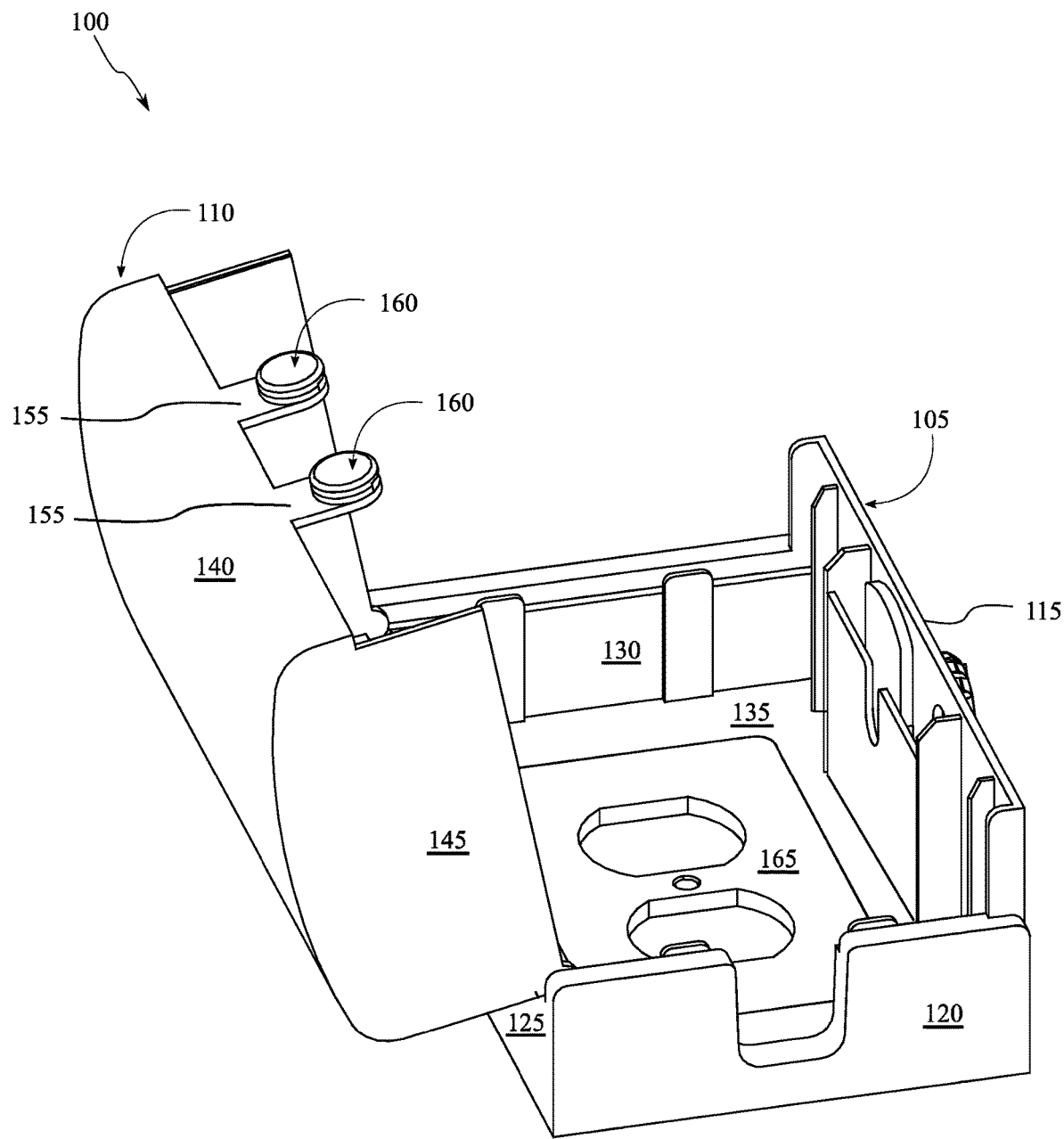
FIG. 1 depicts a perspective view of an electrical receptacle protective enclosure (hereinafter "ERPE") in the "open" view, in accordance with some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the disclosed aspects of the disclosure and may further incorporate only one or a plurality of the features disclosed herein. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Electrical receptacles (also known as electrical outlets) are sockets that connect electrical devices to electricity supplies. For example, in buildings, electrical outlets may be installed in walls, although they can also be installed in floors. The human body conducts electricity, which means that electrical energy can flow through the body. As such, direct contact with electrical current typically result in electrical injury and occasionally death. While some electrical injuries look minor, there still may be serious internal damage, especially, for example, to the heart, muscles, or brain.

FIG. 1 depicts a perspective view of an electrical receptacle protective enclosure, generally 100, in the "open" view, in accordance with some embodiments. Embodiments of the present seek to provide electrical receptacle protective enclosures (herein after "ERPE"). ERPE 100 is an apparatus that restricts or limits child access to electrical receptacles. To reduce the probability of electrical injury, one or more components of ERPE are preferably formed using materials exhibiting reduced electrical conductivity or a high electrical resistivity (e.g., electrical insulators).

For example, applicable materials include, but are not limited to, isoprene, glass, plastics, similar insulating materials, or a combination of two or more thereof. Applicable plastics (i.e. polymers) preferably include, but are not limited to, acrylonitrile butadiene styrenes ("ABS"), alkyd resins, amino resins, epoxy resins, ethylene vinyl acetates, phenol formaldehydes, polyacetals, polyamides, polycarbonates, polyesters, polyethylenes, polymethyl methacrylates, polymethyl pentanes, polyphenylene oxides, silicones, polyphenylene sulfides, polypropylenes, polystyrenes, polysulphones, polytetrafluoroethenes, polyvinyl chlorides ("PVC"), styrene acrylonitriles, urea formaldehydes, or a combination of two or more thereof.

For example, ERPE 100 components disclosed herein can be formed using materials coated with one or more of the aforementioned insulating materials. In certain embodiments, one or more ERPE components are formed using molding techniques (e.g., rotational, injection, blow, and similar molding processes), casting techniques (e.g., polymer casting and similar casting processes), additive manufacturing techniques (i.e. three-dimensional printing), computer numerical control ("CNC") machining techniques, as well as similar manufacturing processes.

ERPE 100 is an enclosure configured to be demountably affixed to any standard electrical receptacle according to some embodiments. ERPE 100 preferably includes main body 105 and covering 110. Covering 110 is rotatably coupled to main body 105. In certain embodiments, covering 110 axially pivots towards and away from main body 105, for example, when ERPE 100 is demountably affixed to an electrical receptacle.

Aspects of ERPE 100 include a "closed" state, "open" state, "locked" state, and "unlocked" state. To be sure, ERPE 100 is preferably a substantially rectangular hollow structure (i.e. includes empty space inside) according to certain embodiments. However, in other embodiments, ERPE 100 assumes one or more alternative hollow geometric shapes (e.g., squares, triangles, quadrilaterals, pentagons, other geometric shapes, or a combination of two or more thereof). As used herein, the term "closed" state refers to an orientation of ERPE 100 that restricts access to the inside (i.e. the internal space) of ERPE 100. As used herein, the term "open' state refers to an orientation of ERPE 100 that allows access to the inside of ERPE 100, for example, to access the electrical receptacle. As used herein, the term "'locked' state" refers to an orientation of ERPE 100 that restricts transitions from the "closed" state to the "open" state, which thereby restricts unauthorized access to the electrical receptacle. As used herein, the term "'unlocked' state" refers to an orientation of ERPE 100 that facilitates transitioning between the "closed" and "open" state.

Referring now to FIGS. 1-4. Covering 110 preferably includes top surface 150 and bottom surface 145 coupled together via surface 140. In some embodiments, surface 140 forms the side surfaces of covering 110 and extends across the axis of elongation of covering 110. For example, top surface 150 and bottom surface 145 are substantially planar. Surface 140 includes one or more locking arms 155 each extending co-planarly from surface 140. Each locking arm 155 includes protrusion 160 positioned on a distal end thereof. In certain aspects, main body 105 is a hollow rectangular structure having left sidewall 125, right sidewall 115, top wall 130, and bottom wall 120 all coupled to back wall 135. For example, covering 110 forms the front wall or covering of ERPE 100. In some embodiments, right sidewall 115 is positioned opposite to and oriented parallel to left sidewall 125.

Figure 11:
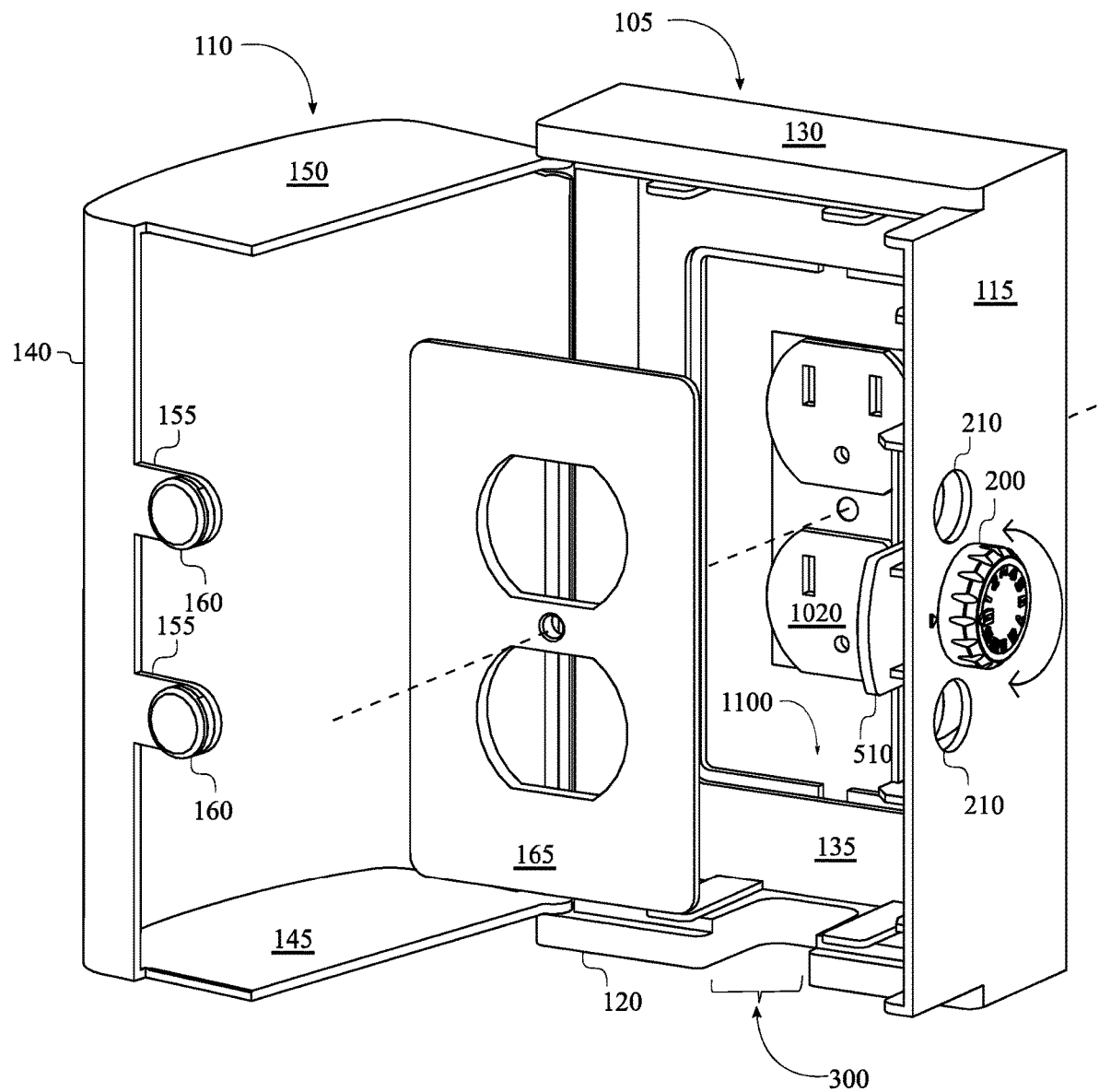
FIG. 11 illustrates installation of the ERPE, in accordance with some embodiments.

In other embodiments, back wall 135 is positioned adjacent to and oriented perpendicular to top wall 130, bottom wall 120, left sidewall 125, and right sidewall 115. In yet still other embodiments, bottom wall 120 is positioned adjacent to and oriented perpendicular to back wall 135, left sidewall 125, and right sidewall 115. Top wall 130 is preferably positioned opposite to and oriented parallel to bottom wall 120. In yet still other embodiments, top wall 130 is positioned adjacent to and oriented perpendicular to left sidewall 125, right sidewall 115, and back wall 135. Aspects of back wall 135 include orifice 1100 (FIG. 11). For example, affixing component 165 is demountably coupled to orifice 1100. In other aspects, affixing component 165 includes one or more features of typical electrical wall plates known in the art. For example, affixing component 165 is an electrical wall plate modified to for insertion into orifice 1100. For example, applicable electrical wall plates include, but are not limited to, standard or decora electrical wall plates.

Figure 2:
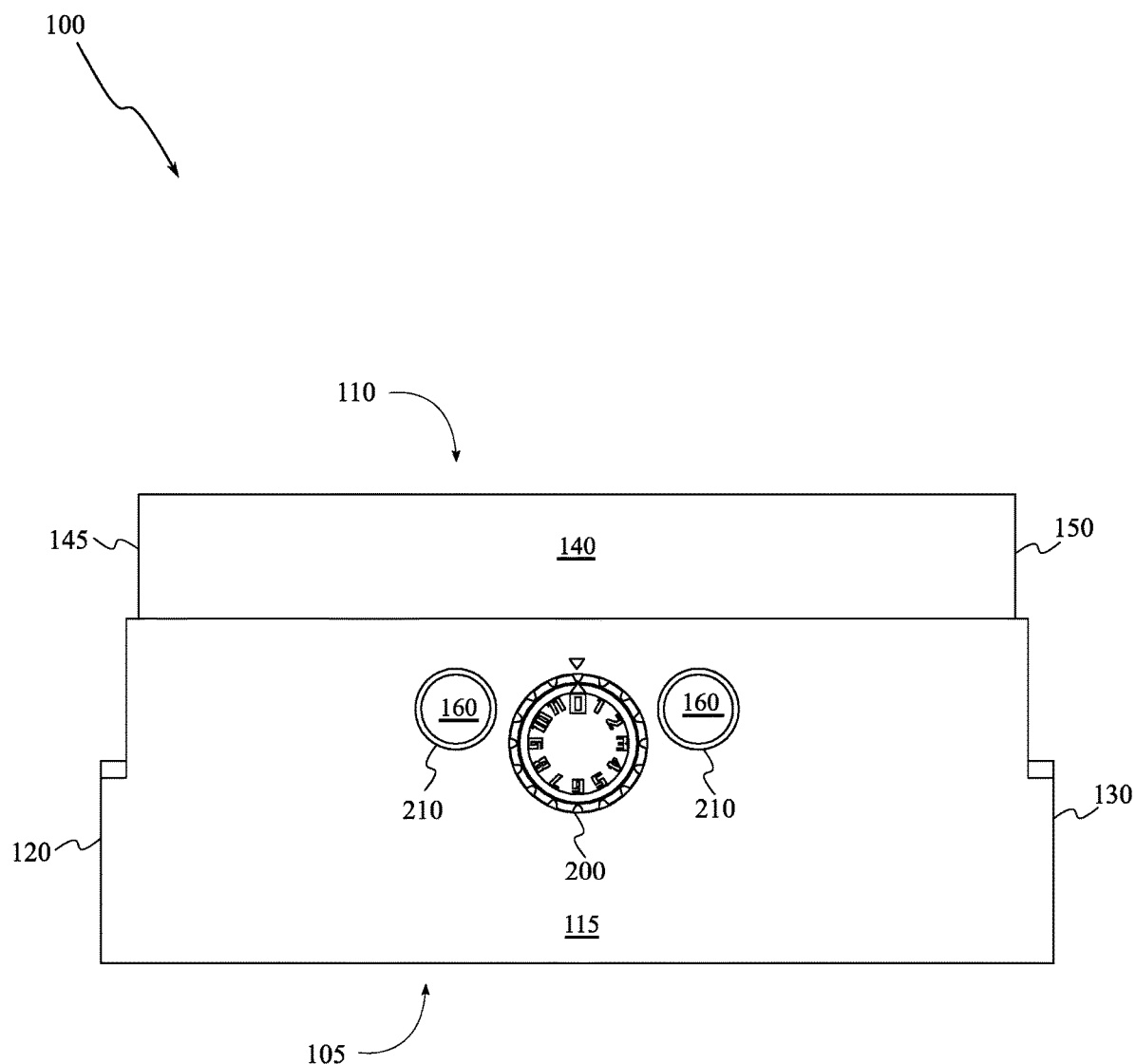
FIG. 2 depicts a right-side view of the ERPE, in accordance with some embodiments.
Figure 3:
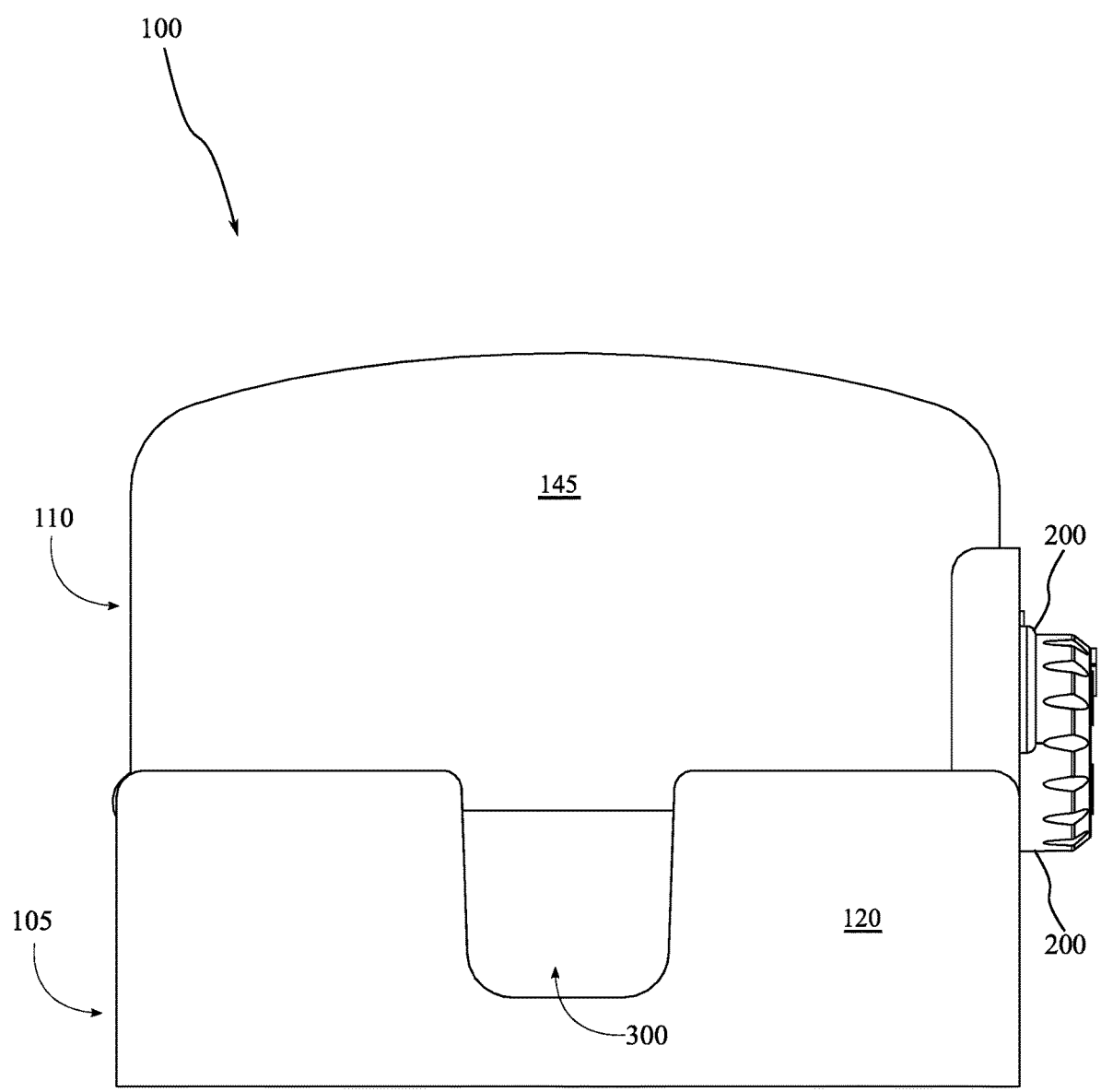
FIG. 3 depicts a bottom view of the ERPE, in accordance with some embodiments.

FIG. 2 depicts a right-side view of ERPE 100 in the "closed" state, in accordance with some embodiments. Specifically, FIG. 2 depicts right sidewall 115, which includes bezel 200 and apertures 210 positioned proximate to bezel 200. In the "closed" state, protrusions 160 preferably engage apertures 210 and thereby restrict transitions from the "closed" state to the "open" state. In the "closed" state, surface 140 is positioned adjacent to right sidewall 115. FIG. 3 depicts a bottom view of ERPE 100 in the "closed" state according to certain embodiments. Here, bottom surface 145 is preferably positioned adjacent to bottom wall 120. In some embodiments, bottom wall 120 includes recess 300, which receives electrical cords of electrical plugs (e.g., electrical plugs 1310) when ERPE 100 is demountably affixed to an electrical receptacle. In other embodiments, recess 300 is a recessed protrusion that extends towards back wall 135.

Figure 4:
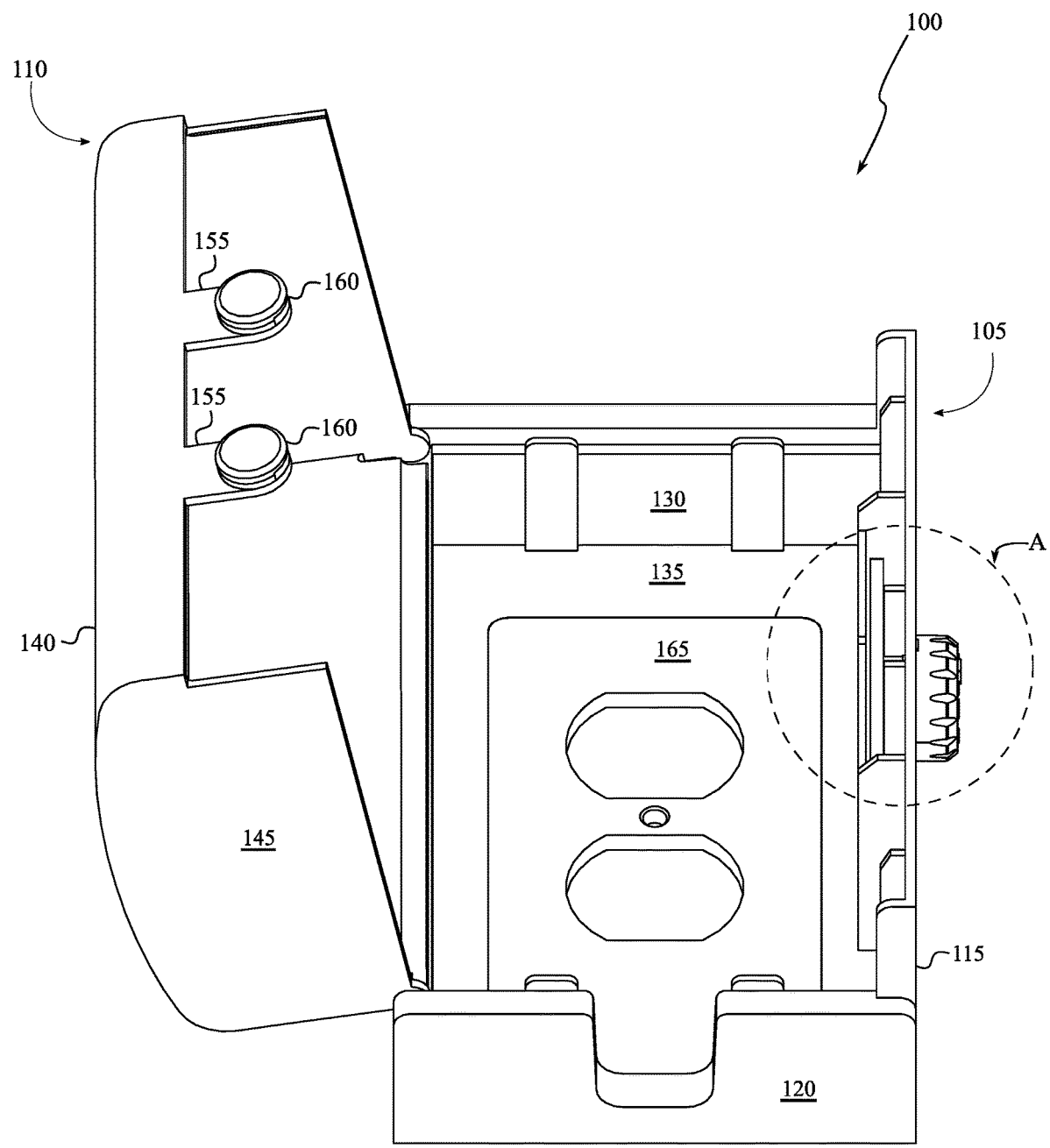
FIG. 4 depicts a top view of the ERPE in the "open" state and View A of the mechanical assembly of the ERPE, in accordance with some embodiments.
Figure 5:
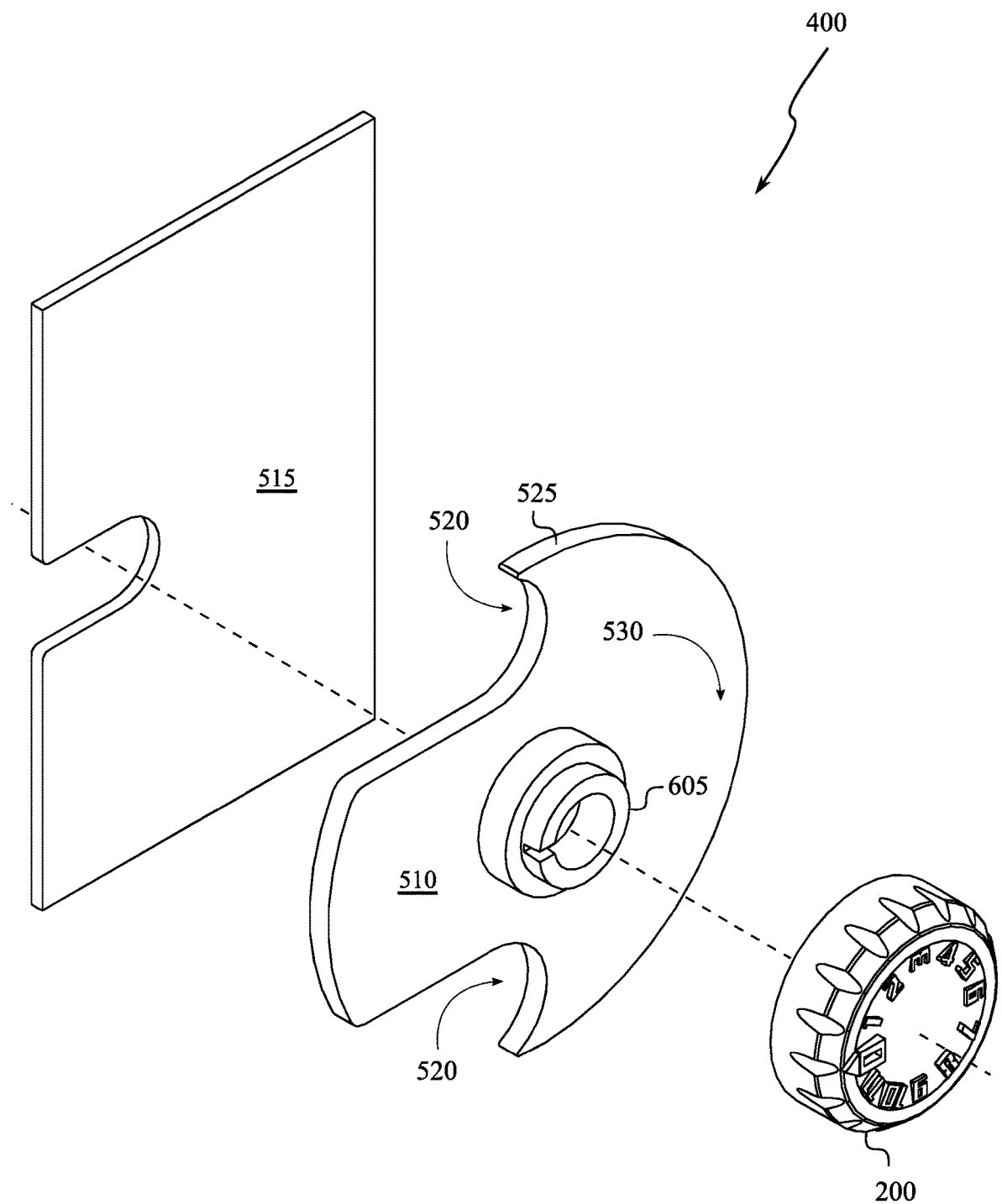
FIG. 5 depicts a front perspective view of the mechanical fastening assembly, in accordance with some embodiments.
Figure 6:
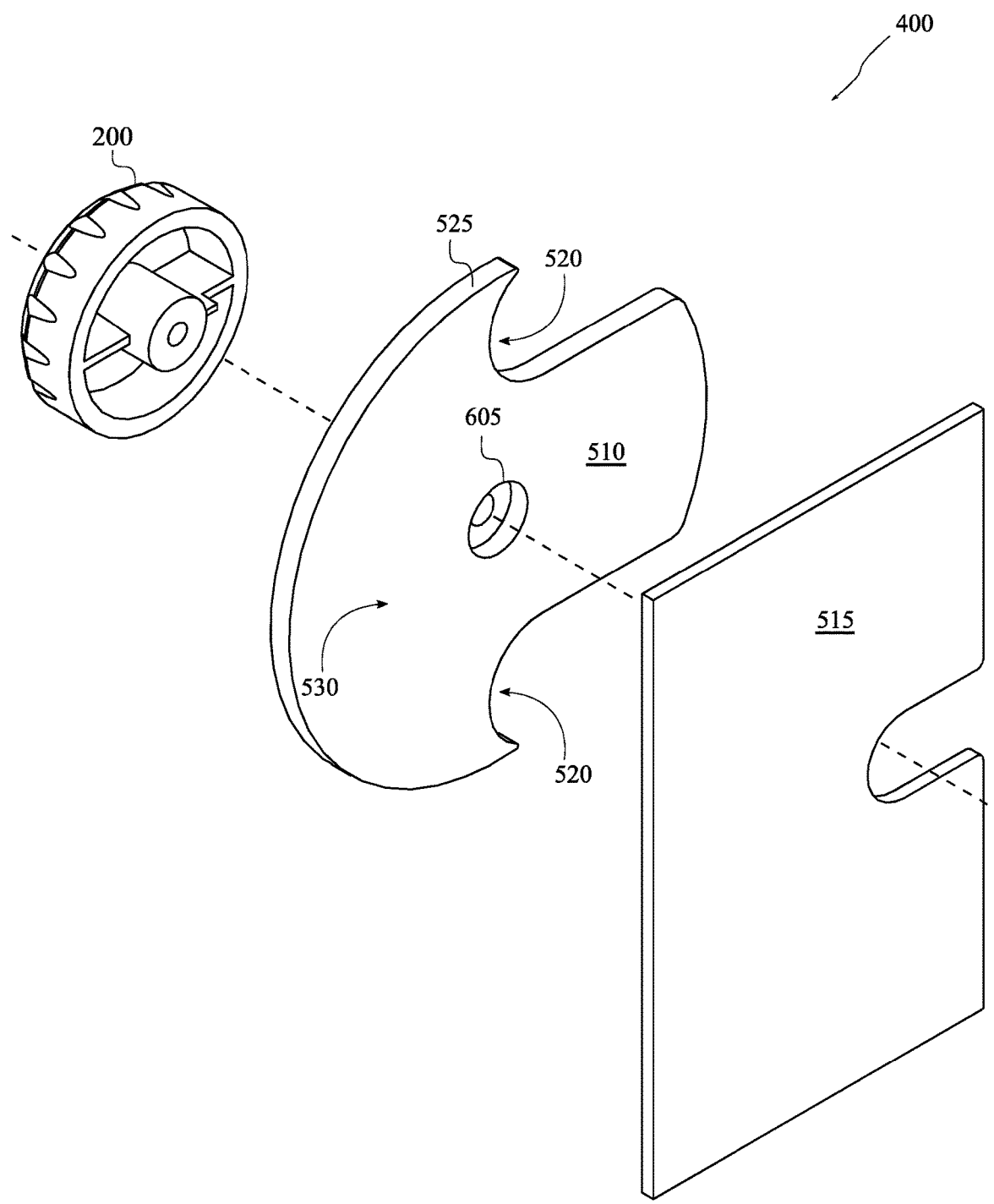
FIG. 6 depicts a rear perspective view of the mechanical fastening assembly, in accordance with some embodiments.

Recess 300 is preferably positioned along the median plane of ERPE 100. For example, recess 300 is configured to receive one or more electric plug cords when electrical plugs are inserted in the electrical receptacle. In the "closed" state, recess 300 is the only conduit between the inside of ERPE 100 and the ambient external environment. Recess 300 preferably has a diameter/structure that reduces a child's ability to access the inside of ERPE 100 via recess 300 using, for example, digits or other object(s). FIG. 4 depicts a top view of ERPE 100 in the "open" state and view A of mechanical fastening assembly 400, in accordance with some embodiments. As depicted in FIGS. 5 and 6, aspects of mechanical fastening assembly 400 include locking element 510 and bezel 200, which is coupled to locking element 510. Locking element 510 is preferably a substantially planar rotatable structure.

In other words, locking element 510 has an overall structure that allows the component to be rotated within ERPE 100 while in the "closed" state. Bezel 200 is preferably a graspable component that facilitates manipulation of locking element 510. Bezel 200 is preferably utilized by users to manually rotate locking element 510 co-planarly with right sidewall 115. Bezel 200 is preferably positioned on the external portion (i.e. an external surface) of right sidewall 115.

Figure 7:
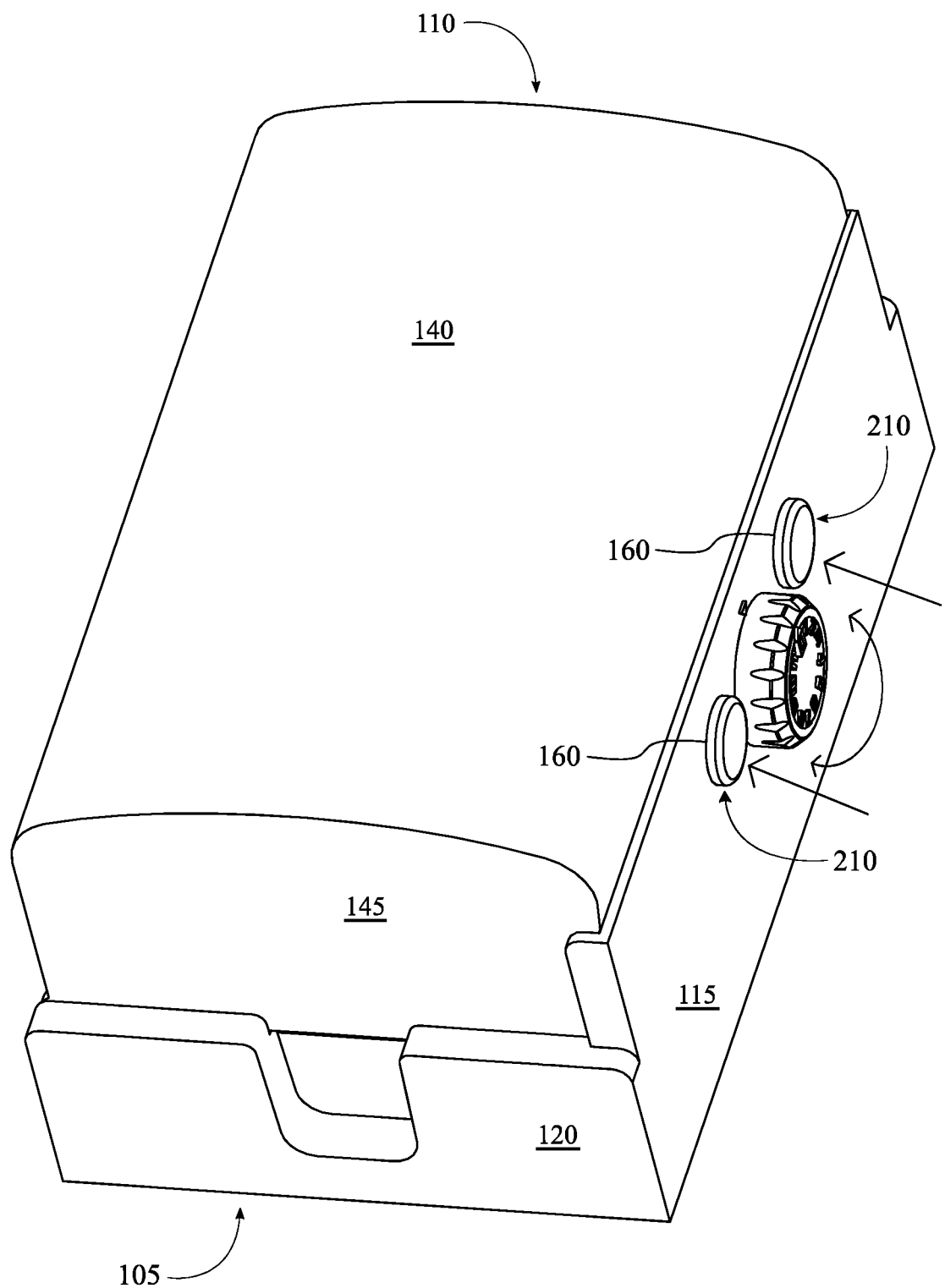
FIG. 7 depicts a top view of the ERPE in the "closed" state, in accordance with some embodiments.

In other words, bezel 200 is utilized to facilitate transitions between the "locked" and "unlocked" states. In certain embodiments, mechanical fastening assembly 400 includes plate 515, which isolates locking element 510 within ERPE 100. For example, plate 515 reduces the probability that components of, for example, electrical plug 1310 can interfere with movements of locking element 510, which thereby increases the reliability of ERPE 100. Certain aspects of locking element 510 include indentations 520, plate region 530, periphery 525, and center 605. For example, plate region 530 is positioned opposite indentations 520. Indentations 520 are preferably positioned on each side of the median plane of locking element 510 and opposite plate region 530. Indentations 520 preferably have a shape that complements locking arms 155. In other embodiments, ERPE 100 can include less or additional indentations 520 than depicted. In certain embodiments, indentations 520 extends from periphery 525 towards center 605. For example, as depicted in FIG. 7, bezel 200 rotates in a common plane with right sidewall 115 and thereby rotates locking element 510 in the common plane with right sidewall 115. In the "closed" state, each aperture 210 receives a protrusion 160.

Figure 8:
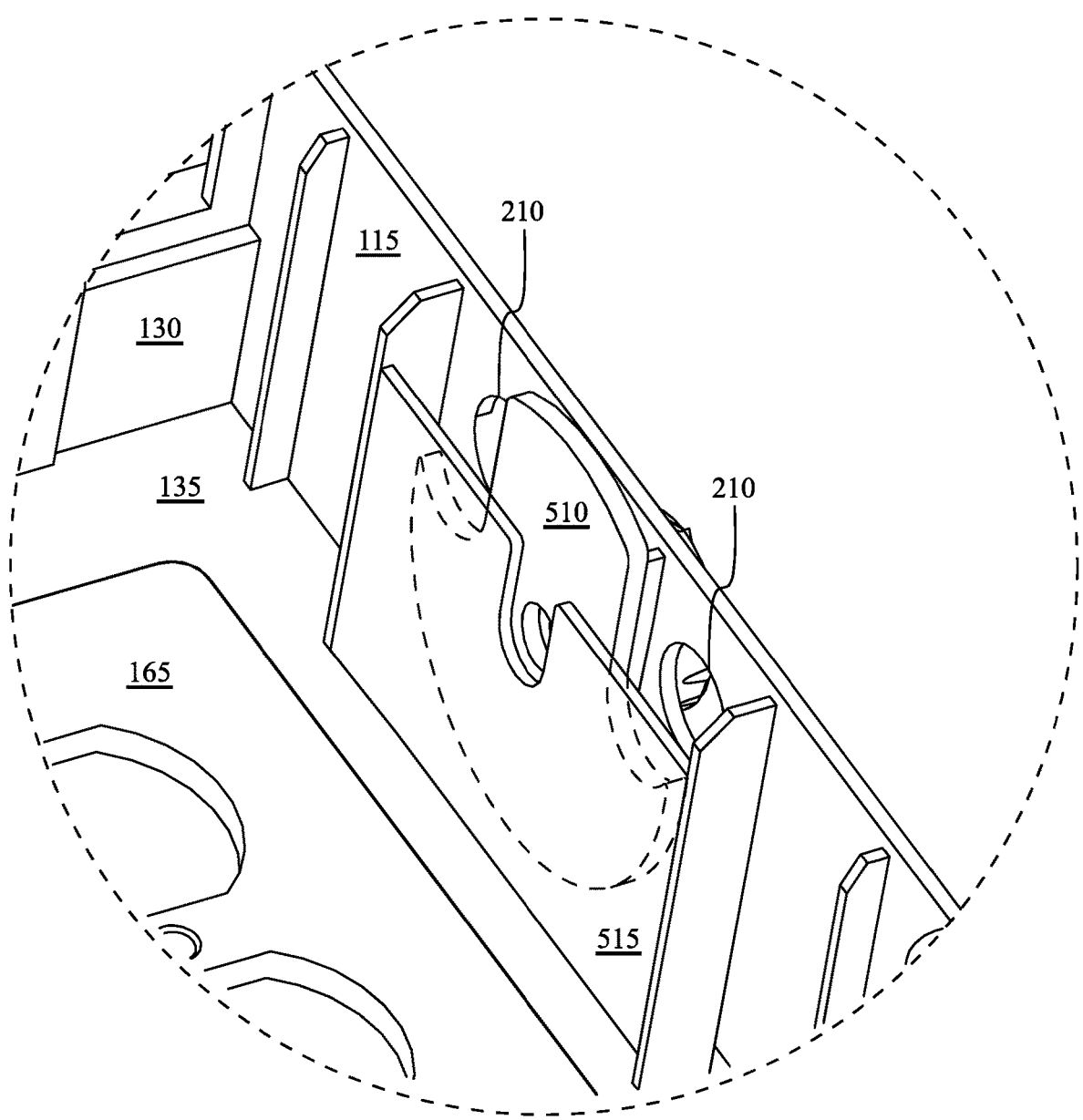
FIG. 8 depicts a left-side perspective view of View A of the mechanical fastening assembly, in accordance with some embodiments.
Figure 9:
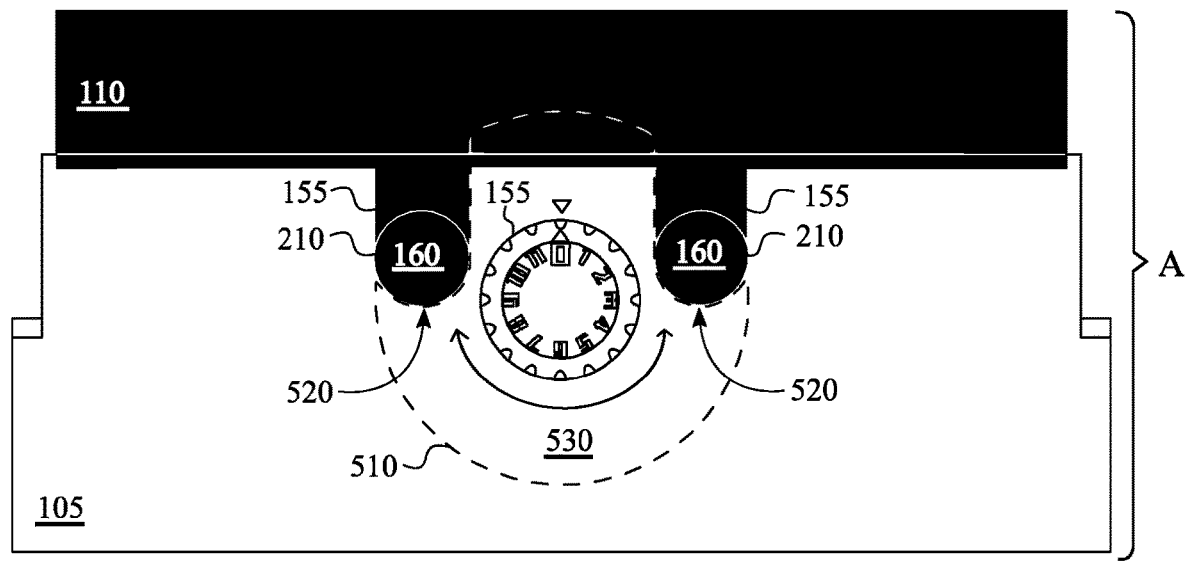
FIG. 9 depicts right-side views of the ERPE in the "unlocked" and "locked" states, Parts A and B, respectively, in accordance with other embodiments.
Figure 9:
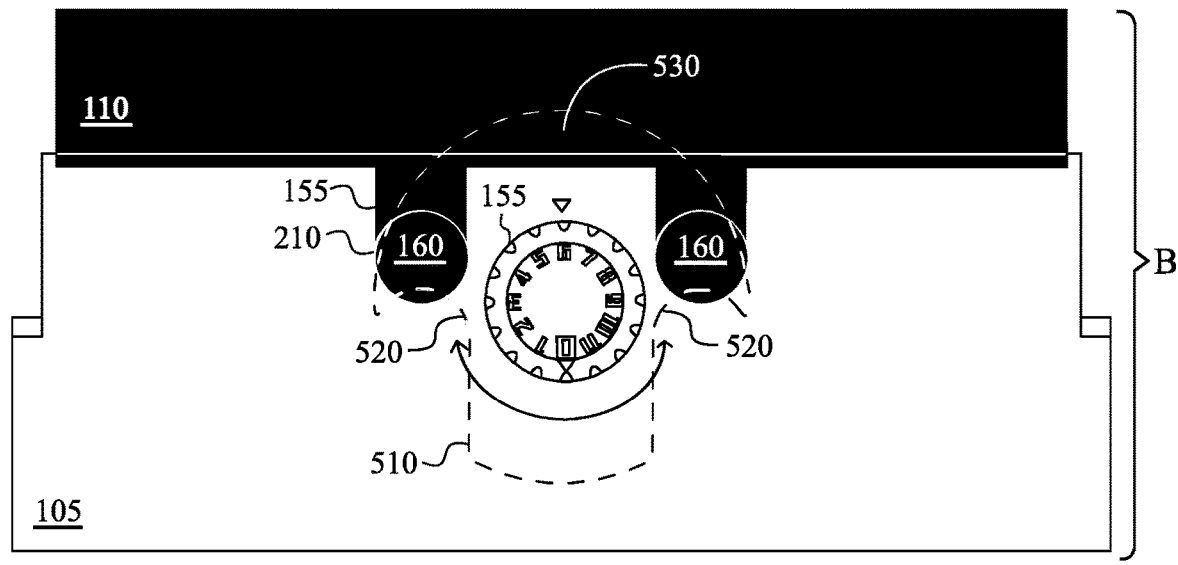

FIG. 8 depicts a left-side perspective view of view A of mechanical fastening assembly 400 according to certain embodiments. Specifically, plate 515 is positioned proximate to back wall 135 and affixing component 165, which isolates locking element 510 therefrom. This isolation ensures that movement of locking element 510 is not hindered by objects inside ERPE 100 while in the "closed" state. FIG. 9 depicts various side views of ERPE 100 in the "unlocked" state (Part A) and "locked" state (Part B) according to yet still other embodiments. To aid the following discussion, cover 110 is color filled, main body 105 is transparent, and locking element 510 is a dashed line. The contrast illustrated in FIG. 9 seeks to emphasize the positioning and orientation of ERPE 100 according to certain embodiments and should not be interpreted as limited in any manner. When ERPE 100 is in the "unlocked" state, indentations 520 are each preferably aligned with one of the apertures 210, which thereby allow locking arms 155 to traverse indentations 520 and protrusions 160 to disengage apertures 210 when a normal force is applied to protrusions 160. On the other hand, when ERPE 100 is in the "locked" state, plate region 530 is aligned with apertures 210 and thereby restricts locking arms 155 from traversing indentations 520 and protrusions 160 from disengaging apertures 210 when a normal force is applied to protrusions 160.

Figure 10:
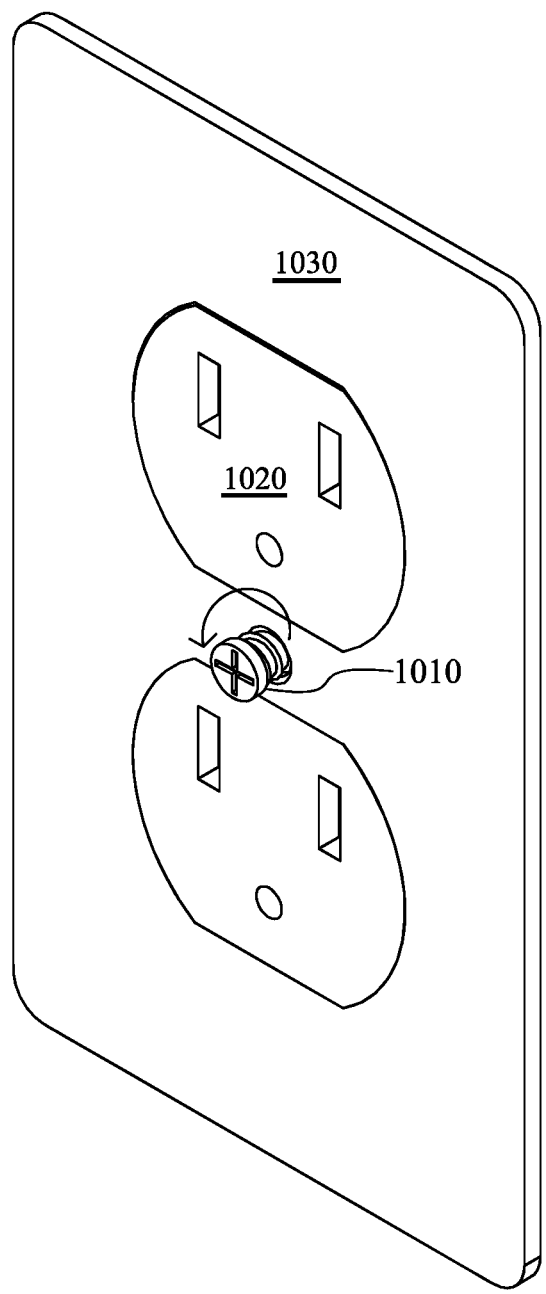
FIG. 10 illustrates removal of a fastener to thereby remove an electrical wall plate from an electrical outlet, in accordance with certain embodiments.
Figure 12:
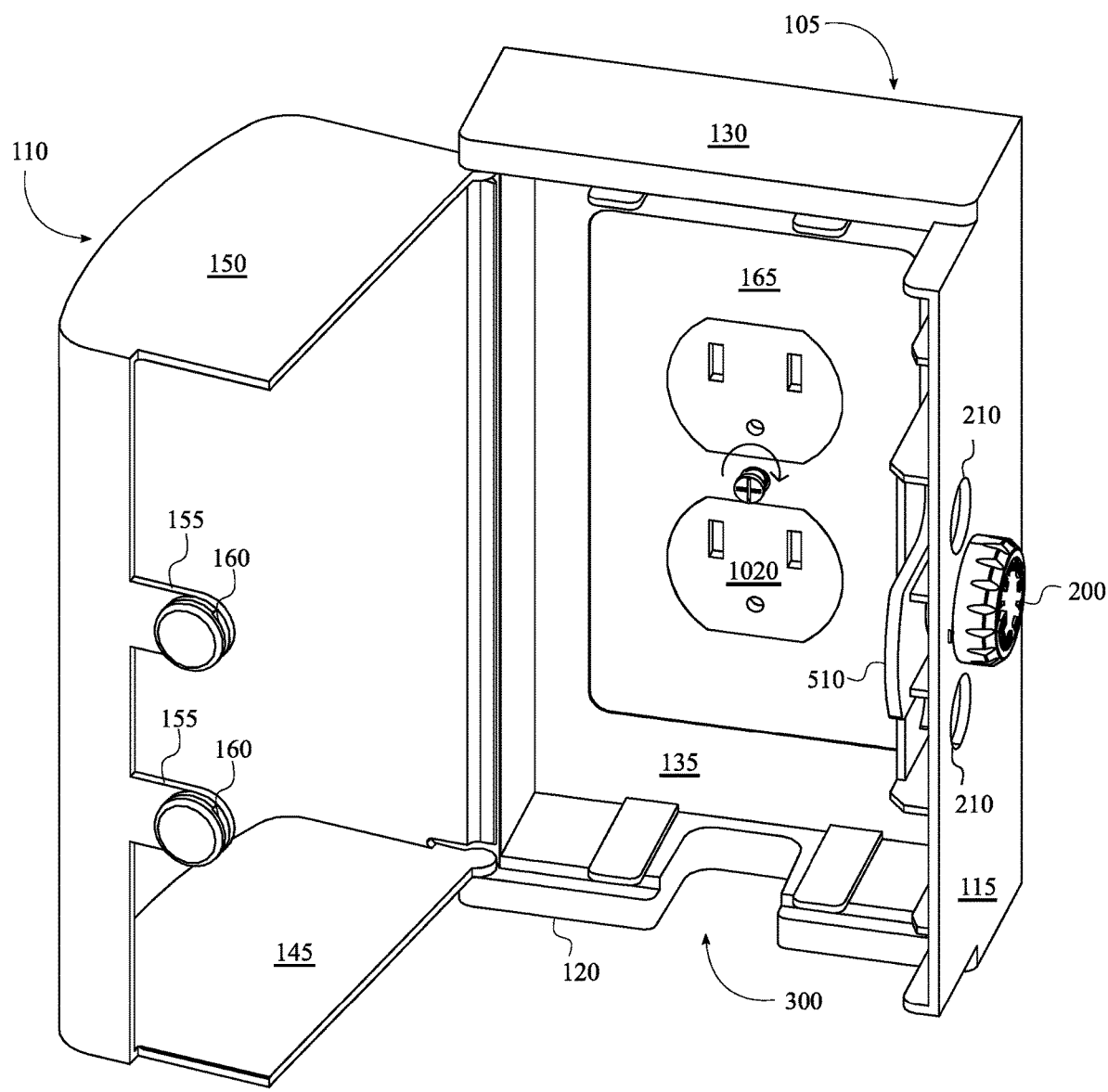
FIG. 12 illustrates installation of the ERPE, in accordance with other embodiments.
Figure 13:
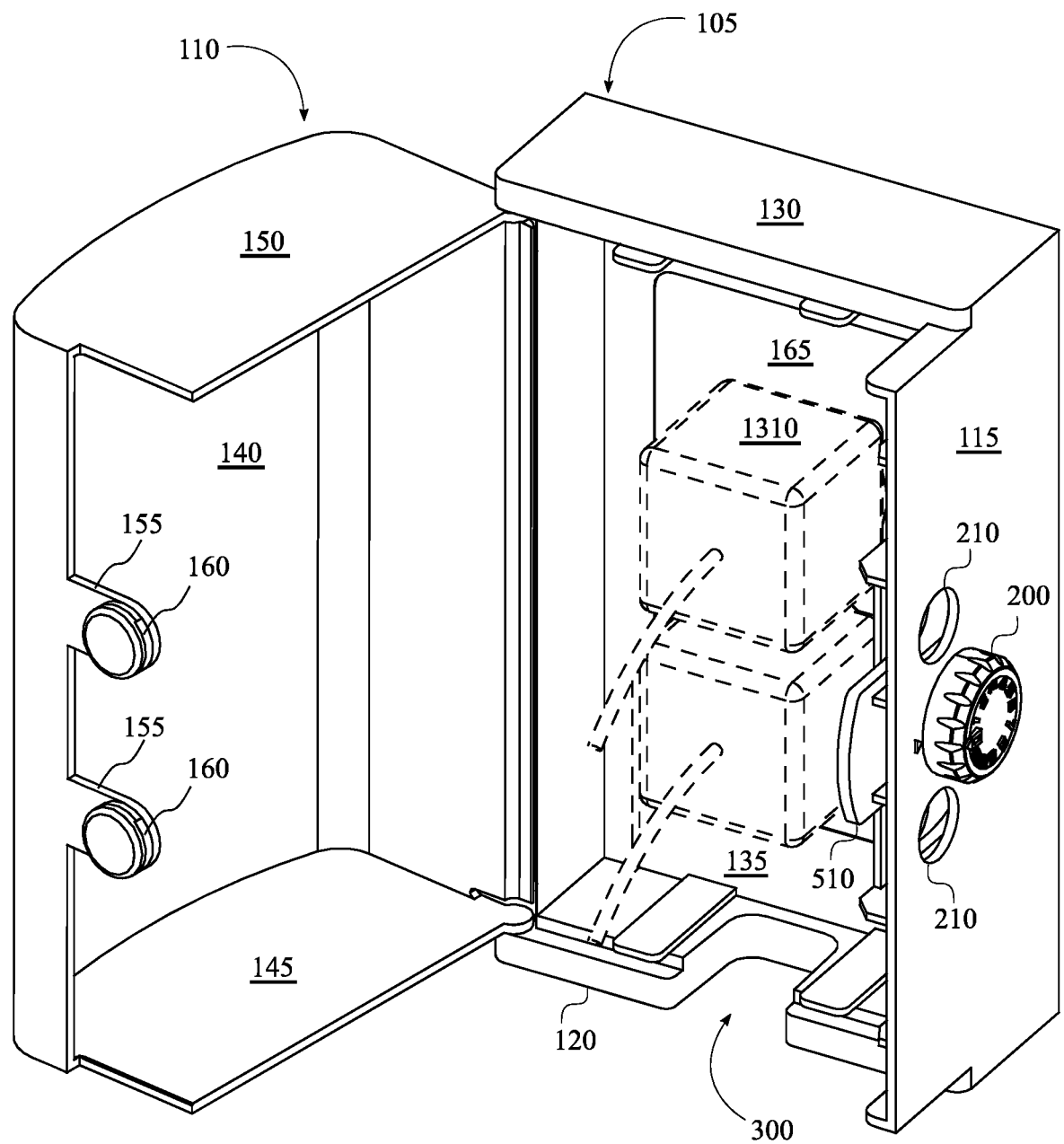
FIG. 13 depicts a perspective view of the ERPE in the "open" state with electrical plugs installed in the electrical outlet, in accordance with yet still other embodiments.
Figure 14:
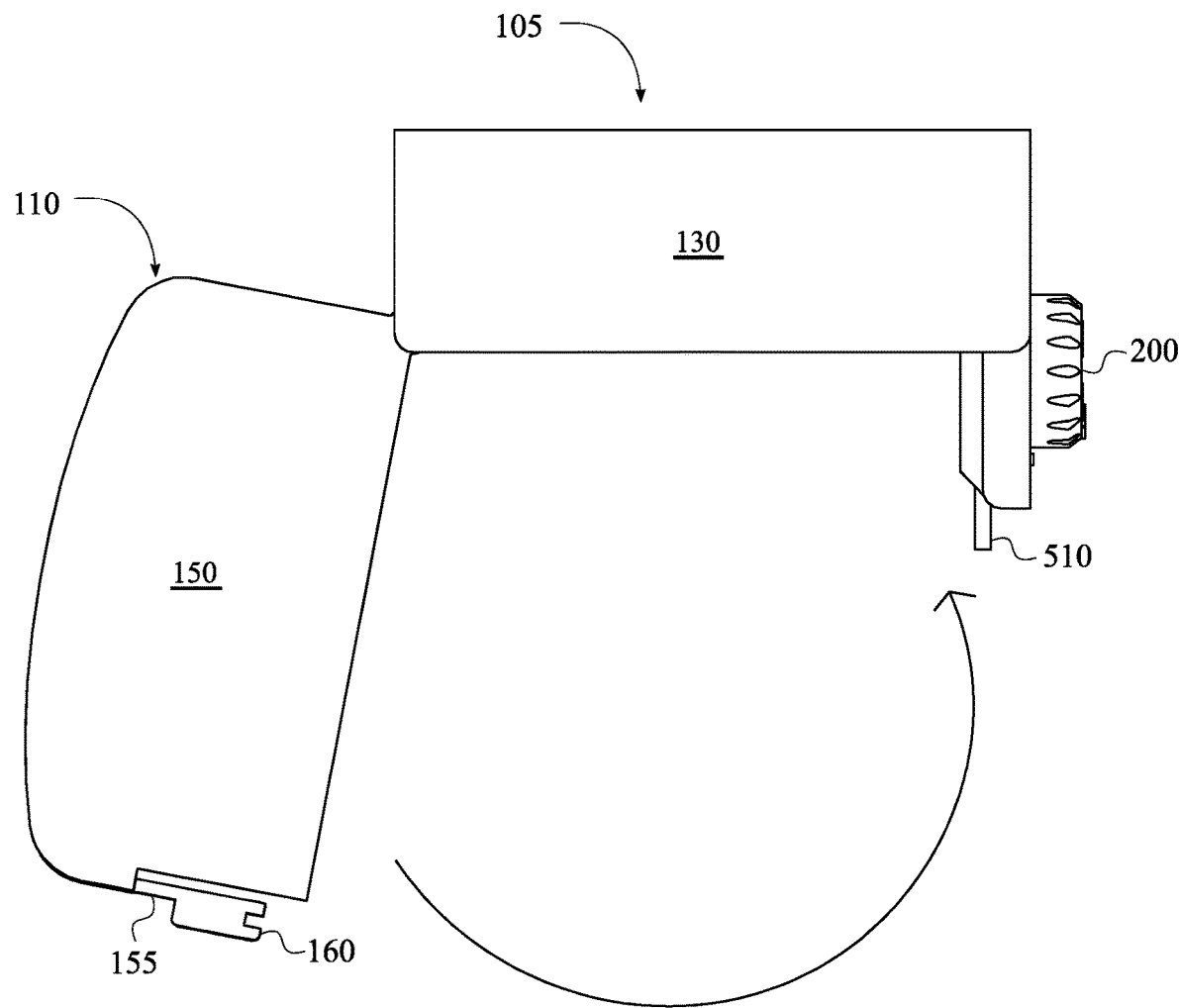
FIG. 14 depicts a top view of the ERPE in the "open" state, in accordance with some embodiments.

FIGS. 10-12 illustrate installation steps for ERPE 100 according to yet still other embodiments. For example, ERPE 100 is preferably installed in the "open" state. To begin, for example, electrical wall plate 1030 is removed from electrical outlet 1020. For example, electrical outlet 1020 is a typical electrical receptacle that connects one or more electrical devices to an electricity supply. For example, removal of fastener 1010 (e.g., a typical screw or other threaded fastener) is required prior to removal of electrical wall plate 1030 from electrical outlet 1020. Fastener 1010 affixes electrical wall plate 1030 to electrical outlet 1020, in accordance with some embodiments. In certain aspects, orifice 1100 is subsequently positioned over electrical outlet 1020 and affixing component 165 is positioned (e.g., demountably coupled) within orifice 1100 proximate to electrical outlet 1020.

Figure 15:
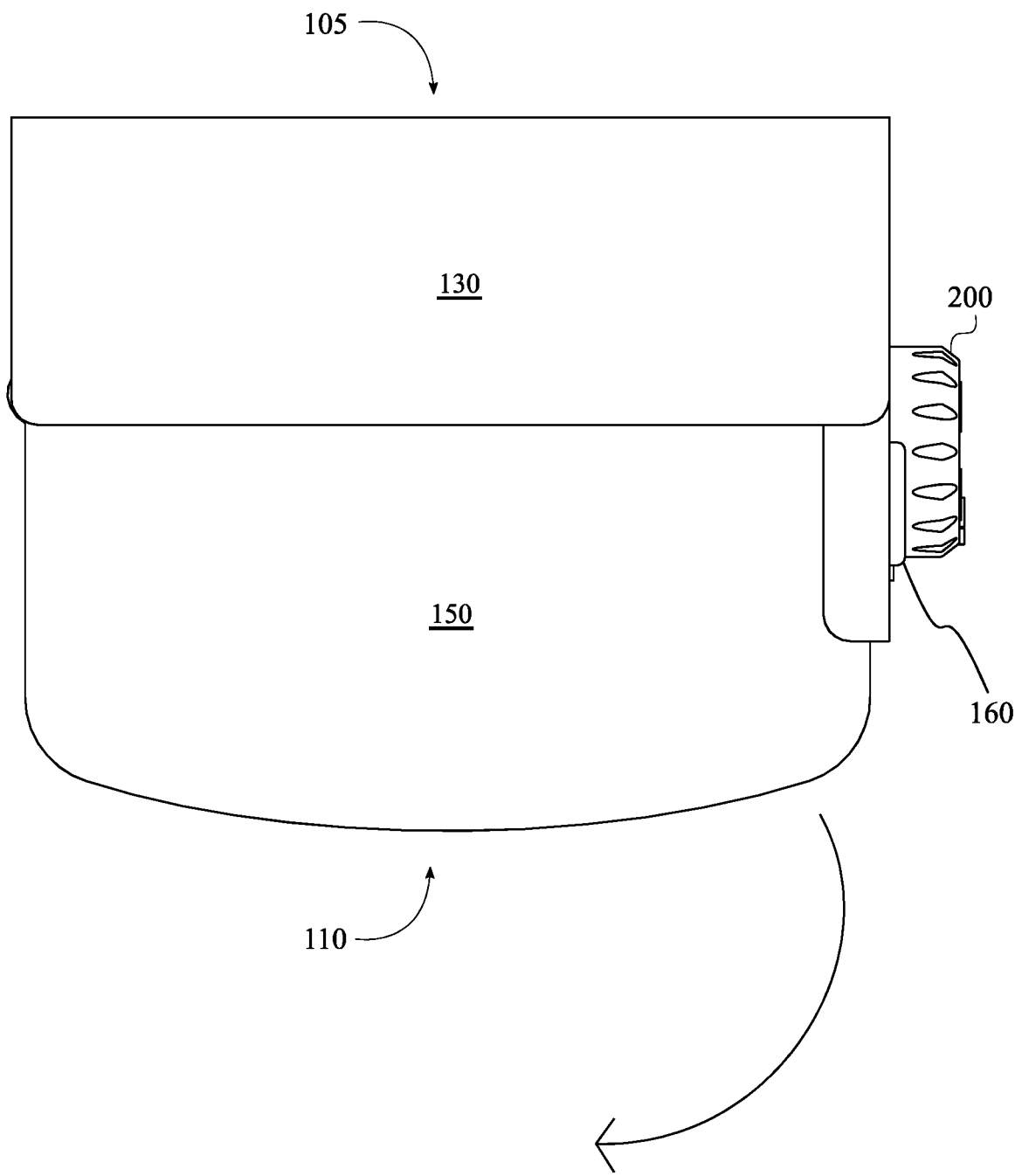
FIG. 15 depicts a top view of the ERPE in the "closed" state, in accordance with other embodiments.

Affixing component 165 is demountably coupled to electrical outlet 1020 via a fastener (e.g., fastener 1010 or similar threaded fasteners) and thereby ERPE 100 is demountably coupled to electrical outlet 1020. Once ERPE 100 is installed, one or more electrical plugs 1310 can be inserted in electrical wall outlet 1020 and ERPE 100 transitioned to the "closed" state. For example, in the "unlocked" state, covering 110 is rotated towards main body 105 until protrusions 160 engage apertures 210 to thereby transition to the "closed" state. In the same vein, in the "closed' state, ERPE 100 is transitioned to the "unlocked" state, pressure is applied to protrusions 160 (e.g., pressure is applied normal to the surface of protrusions 160) to thereby cause protrusions 160 to disengage from aperture 210, and covering 110 is rotated away from main body 105 to thereby transition to the "open" state, as reflected in FIG. 15.

Although the invention has been explained in relation to its preferred embodiment, it is to be understood that many other possible modifications and variations can be made without departing from the spirit and scope of the invention.

The invention claimed is:

1. An electrical receptacle protective enclosure ("ERPE") apparatus comprising:
an enclosure configured to be demountably affixed to an electrical receptacle, the enclosure comprising:
a closed state that restricts access to inside of the enclosure;
an open state that allows access to the inside of the enclosure;
a locked state that restricts a transition from the closed state to the open state;
an unlocked state that facilitates a transition between the closed state and the open state;
a main body comprising a mechanical fastening assembly positioned proximate to an aperture, the mechanical fastening assembly configured to rotate in a common plane with a wall of the main body;
a covering rotatably coupled to the main body and comprising a locking arm extending therefrom, the locking arm comprising a protrusion;
wherein the aperture receives the protrusion in the closed state;
wherein the mechanical fastening assembly comprises a locking element and a bezel coupled to the locking element, the bezel facilitates manipulation of the locking element;
wherein the locking element comprises an indentation and a plate region positioned opposite the indentation;
wherein in the unlocked state, the indentation is aligned with the aperture and thereby allows the locking arm to traverse the indentation and the protrusion to disengage the aperture; and
wherein in the locked state, the plate region is aligned with the aperture and thereby restricts the locking arm from traversing the indentation and the protrusion from disengaging the aperture.

2. The ERPE apparatus of claim 1,
wherein the main body comprises:
a left sidewall;
a right sidewall positioned opposite the left sidewall;
a back wall coupled to the left sidewall and the right sidewall; and
wherein the enclosure is configured to be demountably coupled to an electrical receptacle via the backplate.

3. The ERPE apparatus of claim 2, wherein
the left sidewall is oriented parallel to the right sidewall; and
the back plate is oriented perpendicular to the left sidewall and the right sidewall.

4. The ERPE apparatus of claim 3, wherein the back plate comprises:
an orifice;
an affixing component demountably coupled to the orifice;
wherein the enclosure is configured to be demountably coupled to the electrical receptacle via the affixing component; and
wherein the affixing component is in the form of an electrical wall plate.

5. The ERPE apparatus of claim 4, wherein
the locking element comprises a periphery and a center; and
the indentation extends from the periphery towards the center.

6. The ERPE apparatus of claim 5, wherein
the main body further comprises a bottom wall;
the bottom wall is positioned adjacent to the back plate, the left sidewall, and the right sidewall;
the bottom wall is oriented perpendicular to the back plate, the left sidewall, and the right sidewall; and
the bottom wall comprises a recess configured to receive an electrical cord.

7. The ERPE apparatus of claim 6, wherein
the right sidewall is the wall of the main body; and
the bezel is configured to rotate in the common plane with the right sidewall and thereby rotate the locking element in the common plane with the right sidewall.

8. The ERPE apparatus of claim 7, wherein the indentation comprises a shape complementary to the locking arm.

9. An electrical receptacle protective enclosure ("ERPE") apparatus comprising:
an enclosure comprising:
a closed state that restricts access to inside of the enclosure;
an open state that allows access to inside of the enclosure;
a locked state that restricts a transition from the closed state to the open state;
an unlocked state that facilitates a transition between the closed state and the open state;
a main body comprising a mechanical fastening assembly positioned proximate to an aperture, the mechanical fastening assembly configured to rotate in a common plane with a wall of the main body;
a covering rotatably coupled to the main body and comprising a locking arm extending therefrom, the locking arm comprising a protrusion;
wherein the aperture receives the protrusion in the closed state;
wherein the mechanical fastening assembly comprises a locking element and a bezel coupled to the locking element, the bezel facilitates manipulation of the locking element;
wherein the locking element comprises an indentation and a plate region positioned opposite the indentation;
wherein the indentation comprises a shape complementary to the locking arm;
wherein in the unlocked state, the indentation is aligned with the aperture and thereby allows the locking arm to traverse the indentation and the protrusion to disengage the aperture; and
wherein in the locked state, the plate region is aligned with the aperture and thereby restricts the locking arm from traversing the indentation and the protrusion from the disengaging the aperture.

10. The ERPE apparatus of claim 9,
wherein the main body comprises:
  a left sidewall;
  a right sidewall positioned opposite the left sidewall;
  a back plate coupled to the left sidewall and the right sidewall; and
  wherein the enclosure is configured to be demountably coupled to an electrical receptacle via the backplate.

11. The ERPE apparatus of claim 10, wherein
the left sidewall is oriented parallel to the right sidewall; and
the back plate is oriented perpendicular to the left sidewall and the right sidewall.

12. The ERPE apparatus of claim 11, wherein the back plate comprises:
  an orifice;
  an affixing component demountably coupled to the orifice;
  wherein the enclosure is configured to be demountably coupled to the electrical receptacle via the affixing component; and
  wherein the affixing component is in the form of an electrical wall plate.

13. The ERPE apparatus of claim 12, wherein
the locking element comprises a periphery and a center; and
the indentation extends from the periphery towards the center.

14. The ERPE apparatus of claim 13, wherein
the main body further comprises a bottom wall;
the bottom wall is positioned adjacent to the back plate, the left sidewall, and the right sidewall;
the bottom wall is oriented perpendicular to the back plate, the left sidewall, and the right sidewall; and
the bottom wall comprises a recess configured to receive an electrical cord.

15. The ERPE apparatus of claim 14, wherein
the right sidewall is the wall of the main body; and
the bezel is configured to rotate in the common plane with the right sidewall and thereby rotate the locking element in the common plane with the right sidewall.

* * * * *